US010849059B2

(12) United States Patent
Rai et al.

(10) Patent No.: US 10,849,059 B2
(45) Date of Patent: Nov. 24, 2020

(54) TECHNIQUES FOR VERIFYING SERVICE-BASED WIRELESS COMMUNICATIONS

(71) Applicant: QUALCOMM Incorporated, San Diego, CA (US)

(72) Inventors: Keemat Rai, Hyderabad (IN); Shyam Singh, Hyderabad (IN)

(73) Assignee: QUALCOMM Incorporated, San Diego, CA (US)

(*) Notice: Subject to any disclaimer, the term of this patent is extended or adjusted under 35 U.S.C. 154(b) by 226 days.

(21) Appl. No.: 15/928,716

(22) Filed: Mar. 22, 2018

(65) Prior Publication Data

US 2019/0297558 A1 Sep. 26, 2019

(51) Int. Cl.
*H04W 48/20* (2009.01)
*H04W 12/08* (2009.01)
(Continued)

(52) U.S. Cl.
CPC ............. *H04W 48/20* (2013.01); *H04W 4/60* (2018.02); *H04W 4/70* (2018.02); *H04W 8/005* (2013.01);
(Continued)

(58) Field of Classification Search
CPC ........... H04W 80/04; H04W 12/00516; H04W 36/0072; H04W 36/0077; H04W 36/06;
(Continued)

(56) References Cited

U.S. PATENT DOCUMENTS 8,639,231 B2 1/2014 Pecen
9,699,716 B1 * 7/2017 Osterwise ............ H04W 48/16
(Continued)

FOREIGN PATENT DOCUMENTS

GB 2509975 A 7/2014
WO 2015133640 A1 9/2015
WO 2016049142 A1 3/2016

OTHER PUBLICATIONS

Giesecke & Devrient: "Clarifications about the role of the UICC in storing APN(s)", 3GPP Draft; S1-143052, 3rd Generation Partnership Project (3GPP), Mobile Competence Centre ; 650, Route Des Lucioles ; F-06921 Sophia-Antipolis Cedex; France, vol. SA WG1, No. Sophia Antipolis, France; 20140818-20140822, Jul. 31, 2014 (Jul. 31, 2014), XP050834536, 4 pages, Retrieved from the Internet: URL:http://www.3gpp.org/ftp/tsg_sa/WG1_Serv/TSGS1_67_SophiaAntipolis/docs/ [retrieved on Jul. 31, 2014].
(Continued)

*Primary Examiner* — Ashley Shivers
(74) *Attorney, Agent, or Firm* — Dalei Dong; Arent Fox LLP

(57) ABSTRACT

Aspects described herein relate to obtaining, by a device, access point name (APN) information corresponding to a network entity, the APN information indicating one or more available APNs, determining whether at least one APN of the one or more available APNs indicated in the obtained APN information matches authorized APN information stored in the device, and prohibiting communications for the device that correspond to the at least one APN based at least in part on the determination that the at least one APN is not indicated in the authorized APN information.

26 Claims, 5 Drawing Sheets

300

Obtain APN information corresponding to a network entity 302
Obtain APN information stored on a SIM card 304
Obtain APN information during a network discovery procedure 306
Determine whether at least one APN in the APN information matches an authorized APN 308
Prohibit communications that correspond to the at least one APN where the at least one APN does not match an authorized APN 310
Prohibit network attachment based on determining that the at least one APN does not match the authorized APN 312
Refrain from providing SIM subscription information to the network during a SIM personalization procedure 314
Communicate, via the network entity, service data to a server where the at least one APN matches the authorized APN 316
Perform network attachment to the network entity where the at least one APN matches the authorized APN 318

(51) Int. Cl.

| | |
|---|---|
| ***H04W 4/60*** | (2018.01) |
| ***H04W 12/00*** | (2009.01) |
| ***H04L 29/12*** | (2006.01) |
| ***H04W 48/02*** | (2009.01) |
| ***H04W 8/00*** | (2009.01) |
| ***H04W 4/70*** | (2018.01) |
| ***H04W 12/06*** | (2009.01) |
| *H04W 8/18* | (2009.01) |

(52) U.S. Cl.
CPC ....... *H04W 12/0023* (2019.01); *H04W 12/06* (2013.01); *H04W 12/08* (2013.01); *H04W 48/02* (2013.01); *H04L 61/3075* (2013.01); *H04W 8/183* (2013.01)

(58) Field of Classification Search
CPC ..... H04W 36/08; H04W 40/22; H04W 48/00; H04W 48/20; H04W 72/0426; H04W 72/0433; H04W 88/08; H04W 88/10; H04W 92/045; H04W 4/60; H04W 12/0023; H04W 12/00403; H04W 12/00; H04W 12/0802; H04W 12/0804; H04L 61/3075
See application file for complete search history.

(56) References Cited

U.S. PATENT DOCUMENTS

| | | | | |
|---|---|---|---|---|
| 9,787,726 | B2 * | 10/2017 | Russell | H04L 65/1006 |
| 10,455,057 | B2 * | 10/2019 | Mathison | H04L 67/34 |
| 2017/0078869 | A1 * | 3/2017 | Dong | H04W 12/08 |
| 2017/0347388 | A1 * | 11/2017 | Cai | H04W 72/0493 |

OTHER PUBLICATIONS

International Search Report and Written Opinion—PCT/US2019/023428—ISA/EPO—dated Jun. 27, 2019.

* cited by examiner

TECHNIQUES FOR VERIFYING SERVICE-BASED WIRELESS COMMUNICATIONS

BACKGROUND

Aspects of the present disclosure relate generally to wireless communication systems, and more particularly, to verifying service-based wireless communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

Some wireless communications technologies are typically subscription-based, such that a device can include a subscriber identity module (SIM) card with subscription information used to provision the device on a wireless network. SIM personalization has been introduced to allow for assigning personalization categories (e.g., network, network subset, service provider, corporate, SIM/USIM) and associated codes to SIM cards to control networks and/or network features that can be accessed using the SIM cards. For example, network access can be restricted based on determining whether the device supports communications related to personalization categories and/or corresponding codes that are present on the SIM card.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for wireless communications by an internet of things (IoT) device is provided. The method includes obtaining, by the IoT device, access point name (APN) information corresponding to a network entity, the APN information indicating one or more available APNs, determining whether at least one APN of the one or more available APNs indicated in the obtained APN information matches authorized APN information stored in the IoT device, and prohibiting communications for the IoT device that correspond to the at least one APN based at least in part on the determination that the at least one APN is not indicated in the authorized APN information.

In another example, an apparatus for wireless communications is provided. The apparatus includes a transceiver for communicating one or more wireless signals via at least a receiver and one or more antennas, a memory configured to store instructions, and one or more processors communicatively coupled with the transceiver and the memory. The one or more processors are configured to obtain, by the IoT device, APN information corresponding to a network entity, the APN information indicating one or more available APNs, determine whether at least one APN of the one or more available APNs indicated in the obtained APN information matches authorized APN information stored in the IoT device, and prohibit communications for the IoT device that correspond to the at least one APN based at least in part on the determination that the at least one APN is not indicated in the authorized APN information.

In a further aspect, an apparatus for wireless communications by an IoT device is provided. The apparatus includes means for obtaining, by the IoT device, APN information corresponding to a network entity, the APN information indicating one or more available APNs, means for determining whether at least one APN of the one or more available APNs indicated in the obtained APN information matches authorized APN information stored in the IoT device, and means for prohibiting communications for the IoT device that correspond to the at least one APN based at least in part on the determination that the at least one APN is not indicated in the authorized APN information.

In another example, a computer-readable medium, including code executable by one or more processors for wireless communications is provided. The code includes code for obtaining, by an IoT device, APN information corresponding to a network entity, the APN information indicating one or more available APNs, code for determining whether at least one APN of the one or more available APNs indicated in the obtained APN information matches authorized APN information stored in the IoT device, and code for prohibiting communications for the IoT device that correspond to the at least one APN based at least in part on the determination that the at least one APN is not indicated in the authorized APN information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
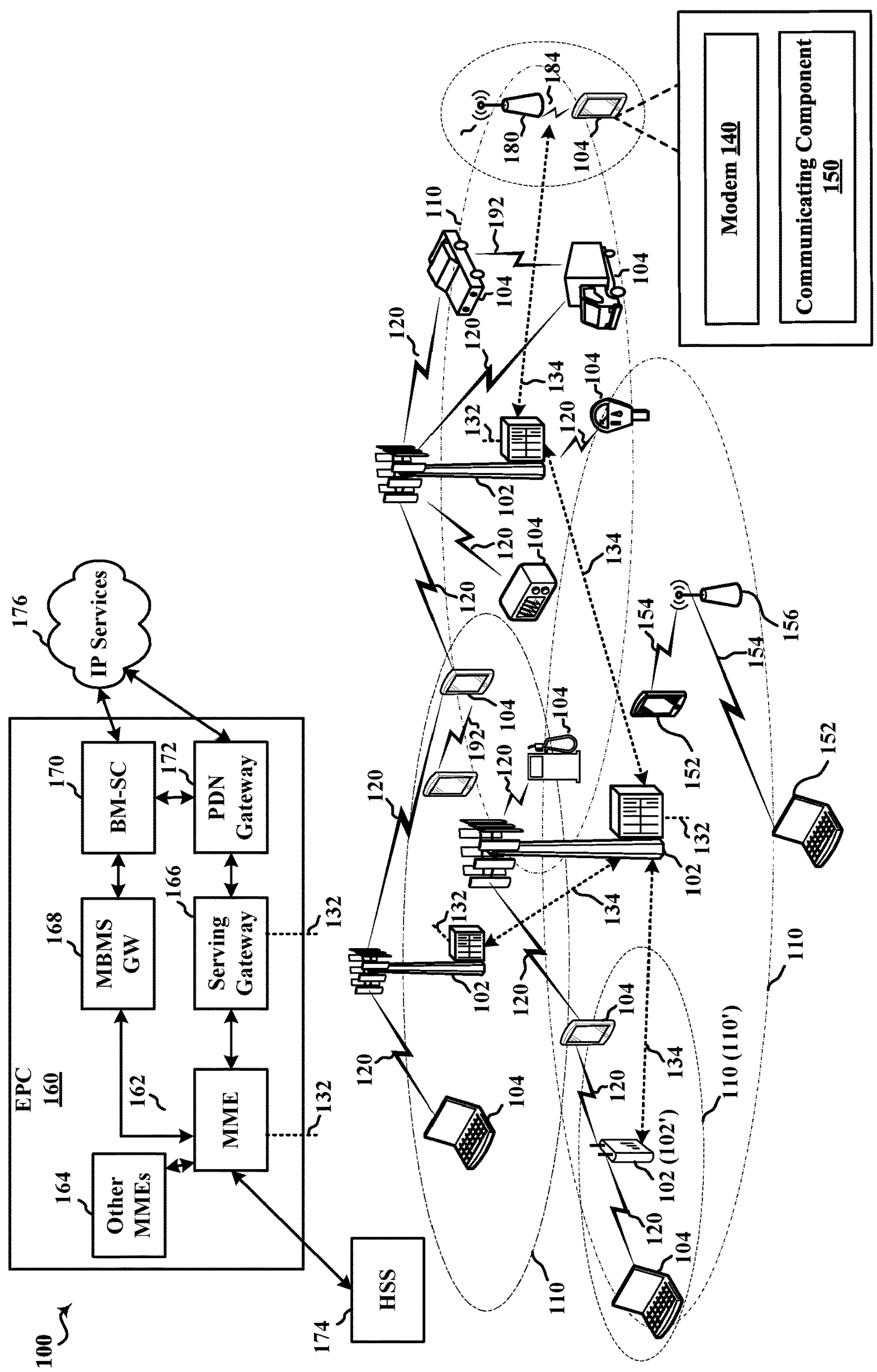
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to verifying service-based wireless communications where a device can indicate a service related to communications from the device, and the indication of the service can be used to determine a network that can support device communications related to the service. For example, the device may be implemented for communicating using only the specific service (or collection of services), and thus may restrict communications to the service (or collection of services), which may include indicating the service during a network discovery or provisioning procedure. In this example, the device may be restricted to accessing a network that allows communications using the service (or collection of services), and/or communications with the network may be restricted to those related to the service (or collection of services). To restrict the communications, the device or network may prohibit communications where the service related to the communications does not match the service indicated for the device. In another example, to restrict the communications, the device or network may prohibit attaching to the network in the first place where the service is not supported by the network (e.g., as indicated by the network in network discovery, indicated based on information stored on the device, such as in subscription information, etc.).

In a specific example, the device may include an Internet of Things (IoT) device, which can refer to a device with network communication capabilities but also functionality for limited purposes. For example, IoT devices can often be associated with a service (or collection of services) for which network connectivity allows reporting and/or receiving of information from a network node related to the service. For example, IoT devices can include vehicles, buildings, appliances, etc. that are embedded with electronics, software, sensors, actuators, etc. for collecting data. The IoT devices are also embedded with network connectivity to enable collection and exchange of data via a wireless network. In any case, the device may be configured to restrict communications to a certain service. In doing so, the device can indicate a service to which to restrict communications. For example, the device may indicate the service using an access point name (APN) as a parameter for a packet data protocol (PDP) connection to a wireless network. The device (and/or network) may prohibit communications to/from a wireless network that are not associated with the indicated APN. In an example, the device (and/or network) may prohibit connection to a network that does not support the indicated APN. In one example, the device may prohibit the connection (or network attach) as part of a subscriber identity module (SIM) personalization procedure, such that network attachment may be prohibited where a network does not support the indicated APN (e.g., based on network provisioning information received as part of discovering the network). In another example, the device may prohibit connection to any network where a SIM card utilized by the device does not support the indicated APN.

As described herein, a SIM personalization procedure may include the personalization features where information is stored in the device that limits the network (e.g., international mobile (IM) network) with which the device can operate by checking the stored information against the SIM/universal SIM (USIM) whenever the device is powered up or a SIM/USIM is inserted in the device. If the check fails, the device can enter a “limited service state” in which only emergency calls can be attempted. There are currently five personalization categories of varying granularity (e.g., network, network subset, service provider (SP), corporate, and SIM/USIM) where each category has a separate set of one or more codes relating to a particular entity. For each activated personalization category on the device, the device retrieves the relevant codes from the SIM/USIM and checks the retrieved code group against a code group (or list of code groups) stored in the device. If a match is found with any of the code groups stored in the device, the check is passed for the category. If all checks pass for all active categories are passed, the device can go into normal operation (e.g., to perform network attachment, publishing of SIM subscription, etc.). In this example, another category may be added to allow, during the SIM personalization procedure, another check of an APN or list of APNs stored on the SIM/USIM against a list of authorized APNs specified by the device itself to allow or prohibit the device from going into normal operation (e.g., to perform network attachment, publishing of SIM subscription, etc.). In another example, the device may check the list of authorized APNs against a list of APNs received from a network entity.

In this regard, device manufacturers can restrict communications to/from devices by using the APN to indicate which services the device use via one or more wireless network. The device can restrict the communications at the network level, as described, and/or at the SIM card level to additionally restrict SIM cards that can be used with the device. Moreover, in one example, the SIM personalization procedure may be modified to include an option (e.g., a category) for allowing this restriction of device communications. In this example, SIM cards used in the device may be configured to enable this option. Thus, during the SIM personalization procedure, the device can determine that the SIM card is configured with the option (e.g., category) to allow blocking the device from entering normal operation based on the APN check, and can accordingly determine if the SIM card (and/or one or more discovered networks) support an APN specified by the device before allowing at least one of attachment to the network via subscription information in the SIM card, publishing of the SIM subscription, etc. In any case, restricting communications in this regard allows device manufacturers to lock communications for the device to those related to the specific service without allowing the device to transmit and/or receive communications related to other services.

The described features will be presented in more detail below with reference to FIGS. 1-5.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

Referring to FIG. 1, in accordance with various aspects described herein, an example wireless communication access network 100 includes at least one UE 104 with a modem 140 for communicating in a wireless network and a communicating component 150 for restricting network communications for the UE 104 based on an indicated service, as described further herein. Further, wireless communication access network 100, also referred to as a wireless wide area network (WWAN), includes at least one base station 102 via which the UE 104 can communicate with one or more nodes of the wireless communication access network to communicate data corresponding to the service. In this regard, for example, communicating component 150 can restrict network communications for the service by determining whether the at least one base station 102 (and/or related network components/entities) support communications for the service, and prohibiting communication and/or network attachment via the base station 102 (and/or related network components/entities) where the service is not supported.

The one or more UEs 104 and/or the one or more base stations 102 may communicate with other UEs and/or other base stations via an Evolved Packet Core (EPC) 160. The base stations 102 (which can be collectively referred to as Evolved Universal Mobile Telecommunications System (UMTS) Terrestrial Radio Access Network (E-UTRAN)) may interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Y*x MHz (where x can be a number of component carriers) used for transmission in each direction. The carriers may or may not be adjacent to or contiguous with each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 156 may perform a clear channel assessment (CCA) prior to communicating in order to determine whether the channel is available. In one example, aspects described herein in the context of a base station 102 may be employed, where appropriate, by an AP 156. Similarly, for example, aspects described herein in the context of a UE 104 may be employed, where appropriate, by a STA 152.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 156. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as a mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 can be a control node that processes signaling between the UEs 104 and the EPC 160. Generally, the MME 162 can provide bearer and connection management. User Internet protocol (IP) packets (e.g., of or relating to the UE 104) can be transferred through the Serving Gateway 166, which itself is connected to the PDN Gateway 172. The PDN Gateway 172 can provide UE IP address allocation as well as other functions. The PDN Gateway 172 and the BM-SC 170 can be connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for one or more UEs 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
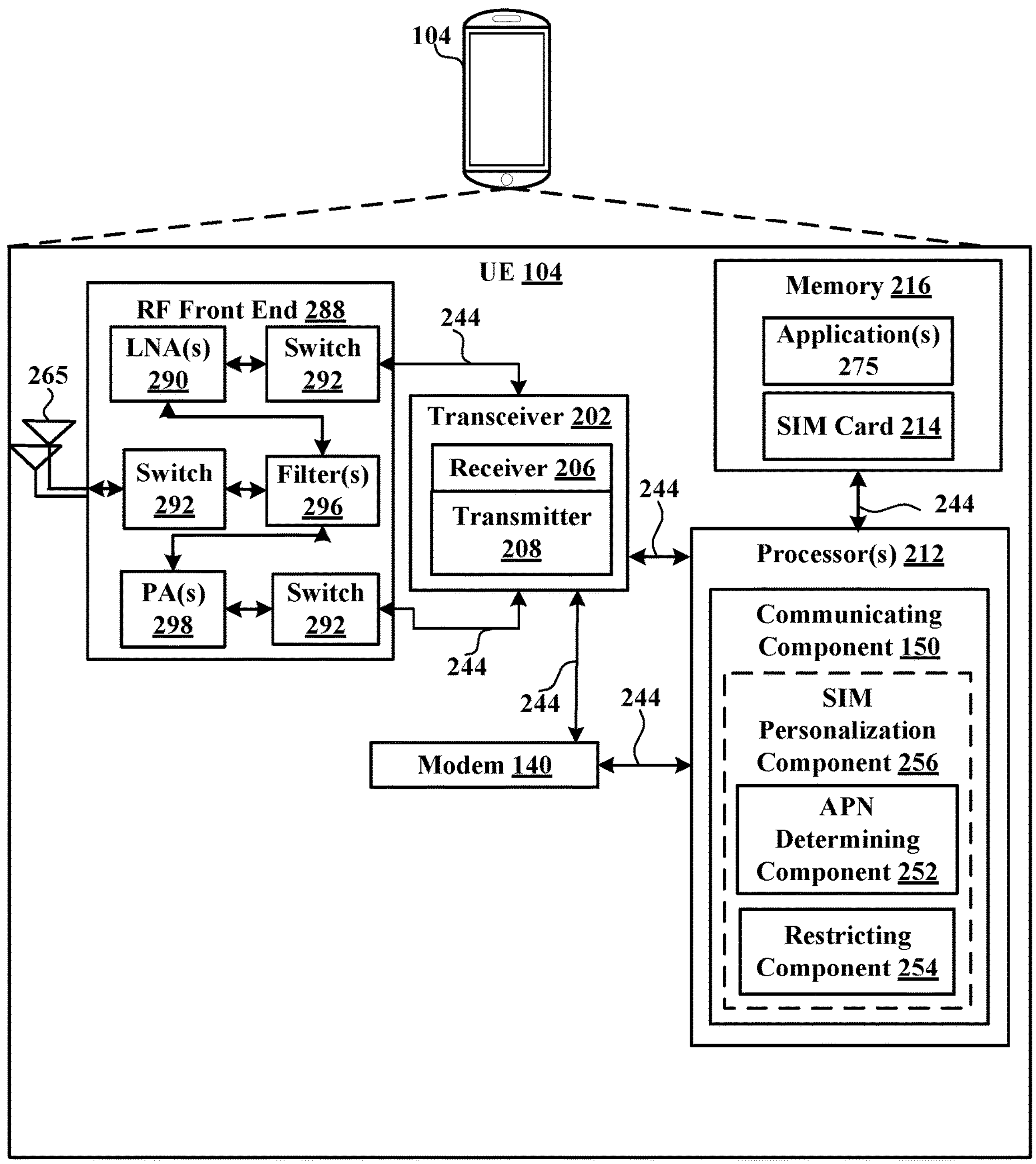
FIG. 2 is a block diagram illustrating an example of a UE, in accordance with various aspects of the present disclosure.
Figure 3:
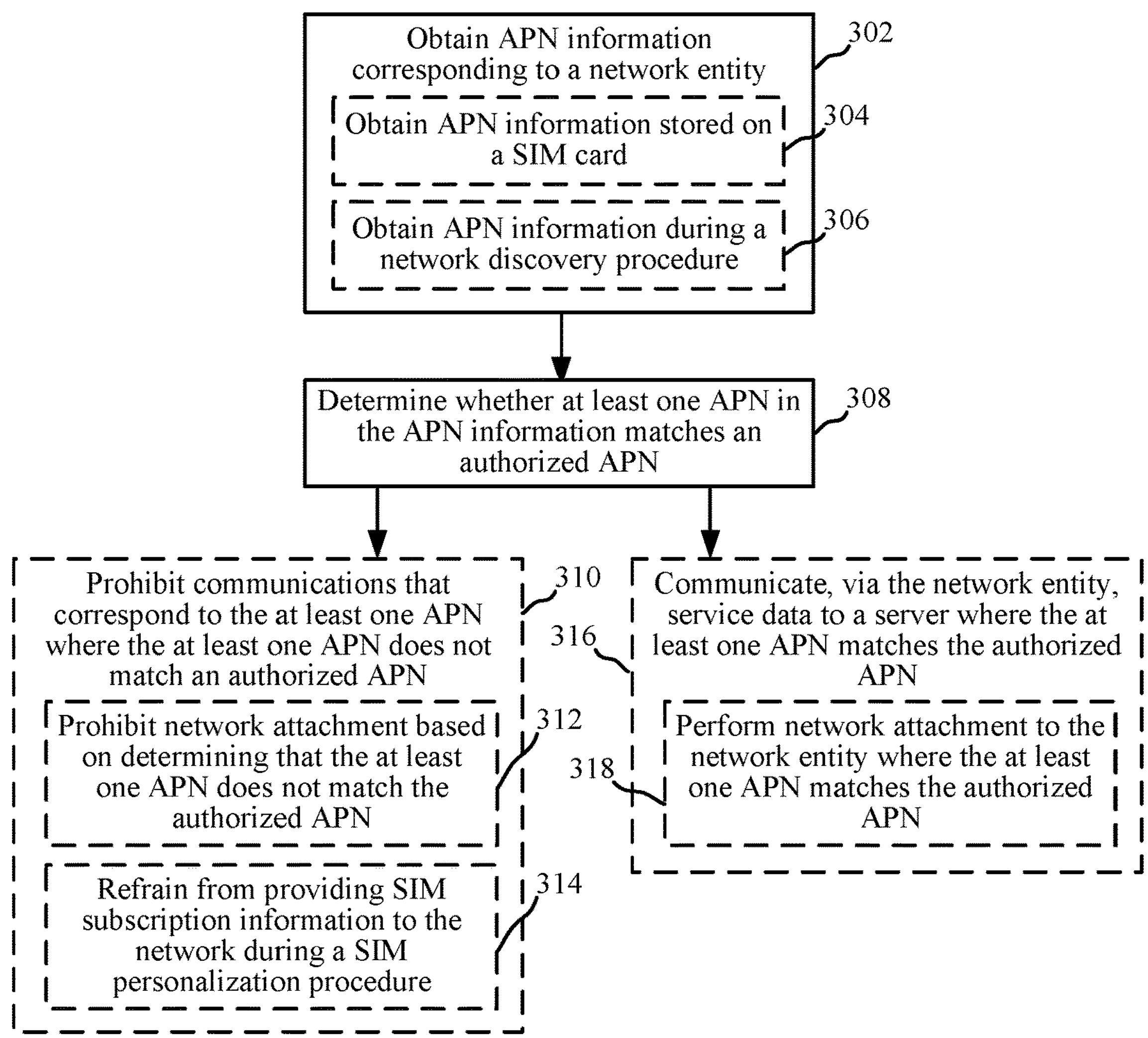
FIG. 3 is a flow chart illustrating an example of a method for restricting communications to one or more services, in accordance with various aspects of the present disclosure.
Figure 4:
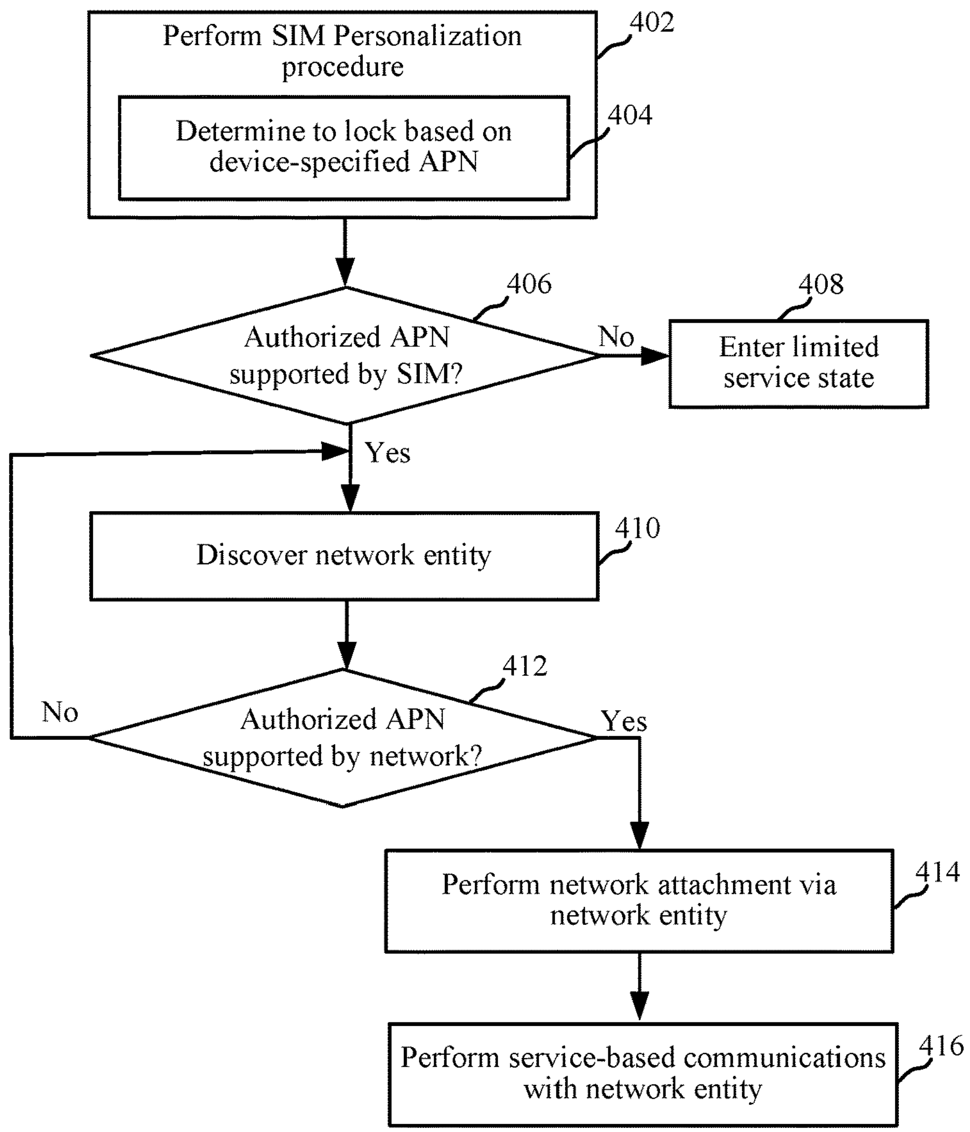
FIG. 4 is a flow chart illustrating an example of a method for restricting communications as part of a subscriber identity module personalization procedure, in accordance with various aspects of the present disclosure.

Turning now to FIGS. 2-5, aspects are depicted with reference to one or more components and one or more methods that may perform the actions or operations described herein, where aspects in dashed line may be optional. Although the operations described below in FIGS. 3-4 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 140 and/or communicating component 150 to enable one or more of the functions described herein related to restricting UE 104 communications to one or more indicated services. Further, the one or more processors 212, modem 140, memory 216, transceiver 202, RF front end 288 and one or more antennas 286, may be configured to support voice and/or data calls (simultaneously or non-simultaneously) in one or more radio access technologies.

In an aspect, the one or more processors 212 can include a modem 140 and/or can be part of the modem 140 that uses one or more modem processors. Thus, the various functions related to communicating component 150 may be included in modem 140 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 140 associated with communicating component 150 may be performed by transceiver 202.

Also, memory 216 may be configured to store data used herein and/or local versions of applications 275 or communicating component 150 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 150 and/or one or more of its subcomponents, and/or data associated therewith, when UE 104 is operating at least one processor 212 to execute communicating component 150 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, SNR, RSRP, RSSI, etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 140 can configure transceiver 202 to operate at a specified frequency and power level based on the UE configuration of the UE 104 and the communication protocol used by modem 140.

In an aspect, modem 140 can be a multiband-multimode modem, which can process digital data and communicate with transceiver 202 such that the digital data is sent and received using transceiver 202. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In one example, memory 216 can include a SIM card 214 that includes subscription information for accessing a wireless network (e.g., via one or more base stations 102). For example, subscription information from the SIM card 214 can be published in communicating with a network entity (e.g., an entity of the EPC 160) to allow the network entity to verify the subscription of the UE 104 for providing network access thereto. For example, the network entity in the EPC 160 can verify one or more parameters indicated in the subscription of the SIM card 214 with one or more parameters stored at the network entity or other entity of the EPC 160. The SIM card 214 may include a universal integrated circuit card (UICC), embedded UICC (eUICC), etc.

In an aspect, communicating component 150 can include an APN determining component 252 for determining a set of one or more APNs available for communicating with a wireless network (e.g., via a base station 102, etc.), which may include a set of APNs supported by a SIM card 214, a set of APNs indicated by a network (e.g., via information broadcast by a base station 102) during network discovery, etc. Communicating component 150 may also include a restricting component 254 for restricting wireless communications with a network entity, attachment to the network, etc., based at least in part on the set of APNs. In one example, communicating component 150 may optionally include a SIM personalization component 256 for performing the determining of the set of APNs and/or the restricting communications as part of a SIM personalization procedure.

In an aspect, the processor(s) 212 may correspond to one or more of the processors described in connection with the UE in FIG. 5. Similarly, the memory 216 may correspond to the memory described in connection with the UE in FIG. 5.

FIG. 3 illustrates a flow chart of an example of a method 300 for restricting (e.g., by a UE) communications to a set of one or more services. In an example, a UE 104 can perform the functions described in method 300 using one or more of the components described in FIGS. 1-2.

In method 300, at Block 302, the UE can obtain APN information corresponding to a network entity. In an aspect, APN determining component 252, e.g., in conjunction with processor(s) 212, memory 216, transceiver 202, communicating component 150, SIM personalization component 256, etc., can obtain the APN information corresponding to the network entity. For example, APN determining component 252 can obtain an indication of a set of APNs from the SIM card 214 inserted in the UE 104, as a set of APNs supported by the SIM subscription information when accessing the network corresponding to a network entity. In another example, APN determining component 252 can additionally or alternatively obtain an indication of a set of APNs supported by the network entity, which can be received in a broadcast message from a base station 102 that facilitates access to the network entity. For example, the network entity can correspond to an entity in the EPC 160 that manages services provided by the network, subscription verification for UEs and/or corresponding SIMs, etc.

Moreover, as described in one example, at least part of the method 300 can be performed as part of a SIM personalization procedure performed by SIM personalization component 256. In this example, SIM personalization component 256 can begin checking SIM personalization codes against codes provided by the network entity, or can otherwise validate the codes with the network entity, before publishing SIM subscription information for accessing the network. In this example, APN determining component 252 can additionally obtain the set of APNs as part of the SIM personalization procedure to allow for locking the UE 104 to communications based only on one or more APNs specified by the UE (e.g., and/or by an application 275 executing on the UE 104).

In obtaining the APN information at Block 302, the UE can optionally, at Block 304, obtain the APN Information stored on a SIM card, and/or at Block 306, obtain the APN information during a network discovery procedure. In an aspect, APN determining component 252, e.g., in conjunction with processor(s) 212, memory 216, transceiver 202, communicating component 150, SIM personalization component 256, etc., can obtain the APN information stored on the SIM card 214 and/or during a network discovery procedure (e.g., based on receiving the APN information from a base station 102 or other access point to a network entity in a broadcast or dedicated message). In one example, the SIM card 214 can include a list of supported APNs stored in an APN control list (ACL), and thus the UE 104 can verify APNs at the SIM level to determine whether or not to even attempt accessing the network. This can allow the UE 104 to not allow use of certain SIM cards and/or allow SIM card manufacturers to not permit use of SIM cards for certain services. In another example, the network can indicate a set of supported APNs, as described, and the UE 104 can verify the APNs at the network level (e.g., additionally or alternatively to verifying first at the SIM level), as described further herein.

In method 300, at Block 308, the UE can determine whether at least one APN in the APN information matches an authorized APN. In an aspect, restricting component 254, e.g., in conjunction with processor(s) 212, memory 216, transceiver 202, communicating component 150, SIM personalization component 256, etc., can determine whether at least one APN in the APN information matches an authorized APN. For example, the UE 104 can generate and store (e.g., in memory 216) a list of authorized APNs such to allow locking the UE 104 for communications based on the set of one or more authorized APNs. In one example, an application 275 executing on the UE 104 can generate and/or possess the authorized APN information. For example, the authorized APN can correspond to a service provided by the UE 104. In any case, restricting component 254 can compare the set of available APNs obtained from the SIM card 214 (and/or from the network entity) to the authorized APNs to determine whether at least one authorized APN is present in the set of available APNs (and/or to determine whether all of the authorized APNs or some other number is present in the set of available APNs). This determination can impact whether the communicating component 150 is permitted to resume normal operations (e.g., to perform network discovery, communicate with one or more network entities, attempt attachment to a network, publish SIM subscription information, etc.)

In an example, the set of one or more authorized APNs can be provided (e.g., by the application 275 or otherwise) to the SIM personalization component 256 for use in executing the SIM personalization procedure. In this example, the SIM personalization component 256 can execute the SIM personalization procedure, as described above, to verify one or more code groups of one or more personalization categories retrieved from the SIM card 214 match the code groups indicated by the UE 104, as described. As part of this procedure, for example, SIM personalization component 256, e.g., in conjunction with the restricting component 254, can determine whether one or more available APNs indicated in the SIM card 214 match authorized APNs specified by the UE 104. In an example, the set of one or more authorized APNs can correspond to a packet data protocol (PDP) profile set or used by (or otherwise programmed in) the UE 104 for accessing the network.

In method 300, optionally at Block 310, the UE can prohibit communications that correspond to the at least one APN where the at least one APN does not match an authorized APN. In an aspect, restricting component 254, e.g., in conjunction with processor(s) 212, memory 216, transceiver 202, communicating component 150, SIM personalization component 256, etc., can prohibit communications that correspond to the at least one APN where the at least one APN does not match an authorized APN. For example, restricting component 254, in this example, can restrict the communications based on verifying an APN related to the communications being received or transmitted by the UE 104, can restrict performing network attachment to a network entity where the at least one APN does not match the authorized APN, can prohibit the UE 104 from entering a normal operation mode or publishing SIM subscription information where the at least one APN does not match the authorized APN, etc.

For example, in prohibiting the communications at Block 310, optionally at Block 312, the UE can prohibit network attachment based on determining that the at least one APN does not match the authorized APN. In an aspect, restricting component 254, e.g., in conjunction with processor(s) 212, memory 216, transceiver 202, communicating component 150, SIM personalization component 256, etc., can prohibit network attachment based on determining that the at least one APN does not match the authorized APN. For example, restricting component 254 can obtain the set of one or more authorized APNs stored by the UE 104, and where the set or at least one APN in the set does not match APNs in the set of available APNs determined from the SIM card 214 and/or network entity, restricting component 254 can prohibit network attachment. For example, prohibiting network attachment may include prohibiting network discovery in the first place, prohibiting attaching to a network that does not support the authorized APN once the network is discovered and determined to not support the authorized APN, etc.

In another example, in prohibiting the communications at Block 310, optionally at Block 312, the UE can refrain from providing SIM subscription information to the network during a SIM personalization procedure. In an aspect, restricting component 254, e.g., in conjunction with processor(s) 212, memory 216, transceiver 202, communicating component 150, SIM personalization component 256, etc., can refrain from providing the SIM subscription information to the network during the SIM personalization procedure. For example, restricting component 254 can refrain from entering a normal operation mode where the UE 104 would normally publish SIM subscription information for use in performing network discovery. Thus, in this example, communications can be locked to the APN by preventing the UE 104 from even performing network discovery if the SIM does not support the APN (e.g., as part of the SIM personalization procedure, as described).

In method 300, optionally at Block 316, the UE can communicate, via the network entity, service data to a server where the at least one APN matches the authorized APN. In an aspect, communicating component 150, e.g., in conjunction with processor(s) 212, memory 216, transceiver 202, SIM personalization component 256, etc., can communicate, via the network entity, service data to a server where the at least one APN matches the authorized APN. For example, communicating component 150 can communicate with the network entity in this regard based on checks performed by the restricting component 254 in determining whether the authorized APN(s) is/are supported by the SIM card 214 and/or network entity, as described above. In an example, communicating component 150 can specify the APN when communicating with the network entity to ensure the communications are provided to the intended service and/or the network entity can forward communications to the UE 104 with the APN to allow the UE 104 to block communications (e.g., via restricting component 254) that are related to APNs other than those authorized by the UE 104, as described above. Moreover, for example, communicating component 150 can communicate data related to the service and/or data related to the network itself, as described further herein, such as performing a network attachment procedure, network keep-alive or other lower layer messaging, etc.

In addition, in an example, in communicating the service data at Block 316, optionally at Block 318, network attachment to the network entity can be performed where the at least one APN matches the authorized APN. In an aspect, communicating component 150, e.g., in conjunction with processor(s) 212, memory 216, transceiver 202, SIM personalization component 256, etc., can perform network attachment to the network entity where the at least one APN matches the authorized APN. For example, communicating component 150 can verify that the SIM card 214 and/or the network entity (e.g., via broadcast information from the base station 102) support the authorized APN(s) specified by the UE 104, and can accordingly allow attachment to a discovered network for communicating service-related data.

In a specific example, the UE 104 may be an IoT device such as a utility meter that collects and reports utility data to a utility service server via the wireless network. In this example, the utility meter can restrict communications to an APN related only to the utility service by using the mechanisms described herein. For example, the utility meter may include a SIM, and can determine whether the SIM supports the APN during a SIM personalization procedure. If so, the utility meter can publish SIM subscription information for discovering one or more networks that also support the utility service APN. Once a network is located, the utility meter can provision on the network to communicate the utility data to the utility service server and/or receive information therefrom, based on indicating the APN in the communications.

FIG. 4 illustrates a flow chart an example of a method 400 for locking a device to communicate using a specific set of one or more authorized APNs. In an example, a UE can perform the functions described in method 400 and/or include the corresponding components of FIGS. 1-2 to lock communications for certain services, as described herein.

In method 400, at Block 402, a SIM personalization procedure can be performed. In an aspect, SIM personalization component 256, e.g., in conjunction with processor(s) 212, memory 216, transceiver 202, communicating component 150, etc., can perform the SIM personalization procedure to verify one or more code groups for specified SIM personalization are consistent among the SIM card 214 and the UE 104, as described. Where the code groups are not consistent (e.g., where the SIM card 214 does not support all code groups indicated by the UE 104), for example, the SIM personalization component 256 can block at least some communications based on the SIM card 214, which may include entering a limited service state such to allow only emergency calling or other uses outside of the specified code groups. As described, in another example, the SIM personalization procedure can be modified to also include an APN check to check whether the SIM card 214 and/or a discovered network entity support communications using one or more APNs authorized by the UE 104.

In this regard, for example, in performing the SIM personalization procedure at Block 402, the UE can, at Block 404, determine to lock based on a device-specified APN. In an aspect, SIM personalization component 256, e.g., in conjunction with processor(s) 212, memory 216, transceiver 202, communicating component 150, etc., can determine to lock based on the device-specified APN. In one example, the UE can specify the APN during SIM personalization, based on which the SIM personalization component 256 can determine to lock based on the device-specified APN. In another example, the SIM personalization procedure can be modified to allow for specifying a parameter to lock based on APN, based on which the SIM personalization component 256 can perform the SIM personalization procedure to verify the APN specified by the UE 104 is supported by the SIM card 214.

In method 400, at Block 406, the UE can determine whether an authorized APN is supported by the SIM card. In an aspect, restricting component 254, e.g., in conjunction with processor(s) 212, memory 216, transceiver 202, communicating component 150, SIM personalization component 256, etc., can determine whether the authorized APN (e.g., as specified by the UE 104) is supported by the SIM card 214, which may be performed as part of the determining to lock based on the device-specified APN. If the authorized APN is not supported by the SIM card, the UE, at Block 408, can enter a limited service state. In an aspect, communicating component 150, e.g., in conjunction with processor(s) 212, memory 216, transceiver 202, etc., can enter the limited service state, and/or a no service state, to block all, or at least some, communications from the UE 104 and/or network entities. In one example, communicating component 150 may allow certain APN communications, such as to discover the UE 104, etc.

If the authorized APN is supported by the SIM card, the UE, at Block 410, can discover a network entity. In an aspect, communicating component 150, e.g., in conjunction with processor(s) 212, memory 216, transceiver 202, etc., can discover the network entity, e.g., based on broadcast signaling received from one or more base stations 102. In one example, the broadcast signaling may indicate parameters related to communicating with the network entity, such as a list of supported APNs, as described. In this example, the UE, at Block 412, can also determine whether the authorized APN is supported by the network. In an aspect, restricting component 254, e.g., in conjunction with processor(s) 212, memory 216, transceiver 202, communicating component 150, SIM personalization component 256, etc., can determine whether the authorized APN is supported by the network (e.g., based on the broadcast signaling). If not, the method 400 can continue to Block 410 where the UE 104 can discover other network entities.

If the authorized APN is supported by the network at Block 412, the UE can, at Block 414, perform network attachment via the network entity. In an aspect, communicating component 150, e.g., in conjunction with processor(s) 212, memory 216, transceiver 202, etc., can perform network attachment via the network entity. For example, communicating component 150 can perform a random access procedure with the network entity (or a base station 102 that facilitates accessing the network entity) based on determining that the network entity supports the authorized APN. In this regard, for example, communicating component 150 can also perform other network-related communications with the network entity and/or base station that facilitate communicating with the network entity.

In another example, if the authorized APN is supported by the network at Block 412, the UE can, at Block 416, perform service-based communications with the network entity. In an aspect, communicating component 150, e.g., in conjunction with processor(s) 212, memory 216, transceiver 202, etc., can perform the service-based communications with the network entity. For example, the communicating component 150 can transmit communications to, or receive communications from, the network entity (e.g., via base station 102), which may include indicating the APN in the communications. In this regard, the UE 104 may filter or otherwise prohibit communications that do not relate to the APN, in one example.

Figure 5:
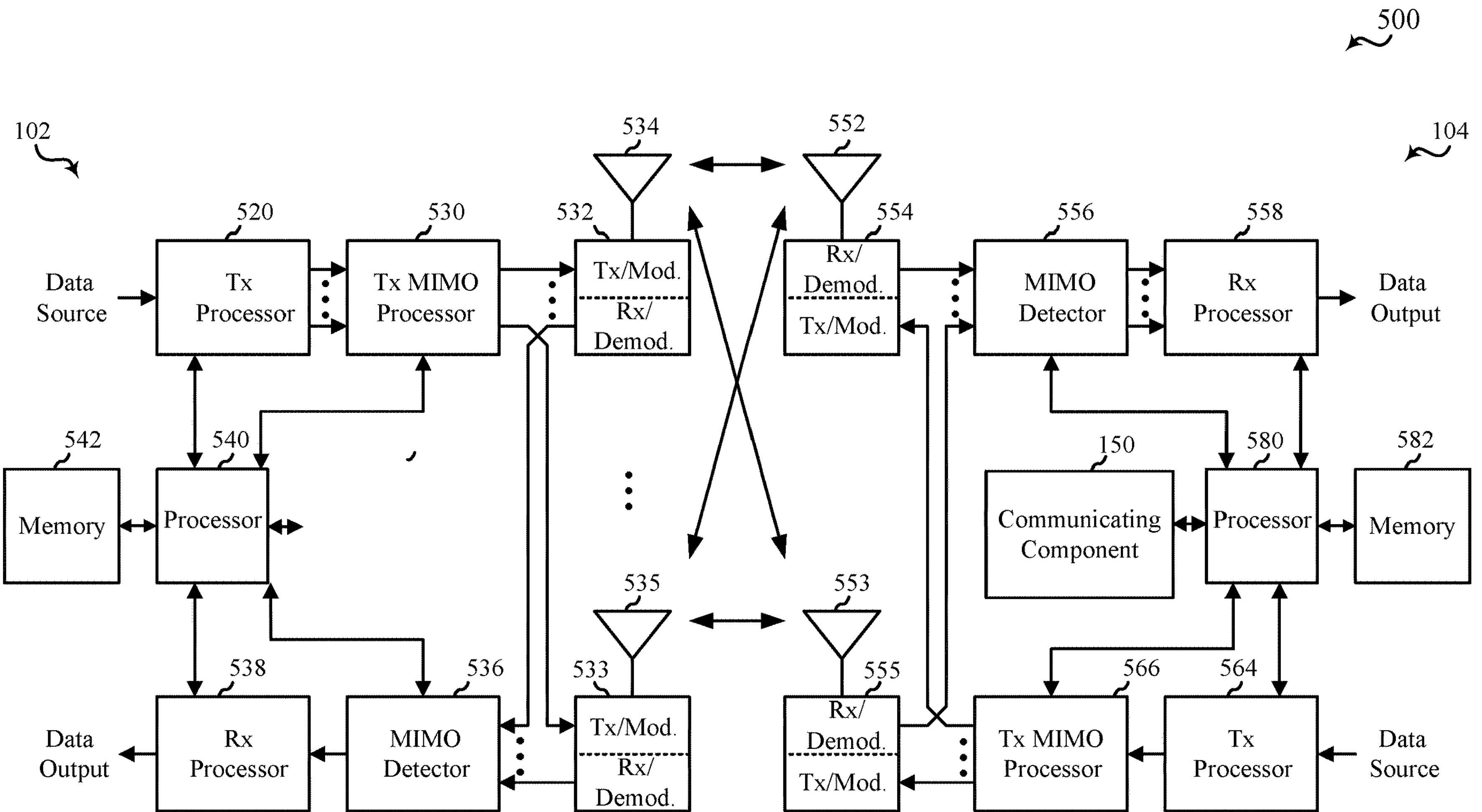
FIG. 5 is a block diagram illustrating an example of a MIMO communication system including a base station and a UE, in accordance with various aspects of the present disclosure.

FIG. 5 is a block diagram of a MIMO communication system 500 including a base station 102 and a UE 104. The MIMO communication system 500 may illustrate aspects of the wireless communication access network 100 described with reference to FIG. 1. The base station 102 may be an example of aspects of the base station 102 described with reference to FIG. 1. The base station 102 may be equipped with antennas 534 and 535, and the UE 104 may be equipped with antennas 552 and 553. In the MIMO communication system 500, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 520 may receive data from a data source. The transmit processor 520 may process the data. The transmit processor 520 may also generate control symbols or reference symbols. A transmit MIMO processor 530 may perform spatial processing (e.g., precoding) on data symbols, control symbols, or reference symbols, if applicable, and may provide output symbol streams to the transmit modulator/demodulators 532 and 533. Each modulator/demodulator 532 through 533 may process a respective output symbol stream (e.g., for OFDM, etc.) to obtain an output sample stream. Each modulator/demodulator 532 through 533 may further process (e.g., convert to analog, amplify, filter, and upconvert) the output sample stream to obtain a DL signal. In one example, DL signals from modulator/demodulators 532 and 533 may be transmitted via the antennas 534 and 535, respectively.

The UE 104 may be an example of aspects of the UEs 104 described with reference to FIGS. 1-2. At the UE 104, the UE antennas 552 and 553 may receive the DL signals from the base station 102 and may provide the received signals to the modulator/demodulators 554 and 555, respectively. Each modulator/demodulator 554 through 555 may condition (e.g., filter, amplify, downconvert, and digitize) a respective received signal to obtain input samples. Each modulator/demodulator 554 through 555 may further process the input samples (e.g., for OFDM, etc.) to obtain received symbols. A MIMO detector 556 may obtain received symbols from the modulator/demodulators 554 and 555, perform MIMO detection on the received symbols, if applicable, and provide detected symbols. A receive (Rx) processor 558 may process (e.g., demodulate, deinterleave, and decode) the detected symbols, providing decoded data for the UE 104 to a data output, and provide decoded control information to a processor 580, or memory 582.

The processor 580 may in some cases execute stored instructions to instantiate a communicating component 150 (see e.g., FIGS. 1 and 2).

On the uplink (UL), at the UE 104, a transmit processor 564 may receive and process data from a data source. The transmit processor 564 may also generate reference symbols for a reference signal. The symbols from the transmit processor 564 may be precoded by a transmit MIMO processor 566 if applicable, further processed by the modulator/demodulators 554 and 555 (e.g., for SC-FDMA, etc.), and be transmitted to the base station 102 in accordance with the communication parameters received from the base station 102. At the base station 102, the UL signals from the UE 104 may be received by the antennas 534 and 535, processed by the modulator/demodulators 532 and 533, detected by a MIMO detector 536 if applicable, and further processed by a receive processor 538. The receive processor 538 may provide decoded data to a data output and to the processor 540 or memory 542.

The components of the UE 104 may, individually or collectively, be implemented with one or more ASICs adapted to perform some or all of the applicable functions in hardware. Each of the noted modules may be a means for performing one or more functions related to operation of the MIMO communication system 500. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 500.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communications by an internet of things (IoT) device, comprising:

obtaining, by the IoT device, first access point name (APN) information corresponding to a network entity, the first APN information indicating one or more available APNs;

receiving, as part of a personalization procedure for a subscriber identity module (SIM) associated with the IoT device, an indication to verify APNs based on second APN information of authorized APNs stored in the IoT device;

determining, based on receiving the indication, whether at least one APN of the one or more available APNs indicated in the first APN information is also indicated in the second APN information stored in the IoT device; and prohibiting communications for the IoT device that correspond to the at least one APN based at least in part on the determination that the at least one APN is not indicated in the second APN information.

2. The method of claim 1, wherein obtaining the first APN information comprises obtaining the first APN information stored on the SIM.

3. The method of claim 2, wherein the first APN information is stored as an APN control list (ACL) on the SIM.

4. The method of claim 1, wherein obtaining the first APN information comprises obtaining the first APN information from the network entity in a network discovery procedure.

5. The method of claim 1, further comprising determining the second APN information based on a packet data protocol (PDP) profile associated with the IoT device.

6. The method of claim 1, wherein the second APN information corresponds to a service provided by the IoT device.

7. The method of claim 1, further comprising:

providing IoT service data to a server upon the determination that the at least one APN of the one or more available APNs is also indicated in the second APN information, wherein the server is associated with the at least one APN.

8. The method of claim 1, further comprising:

receiving, by the IoT device, service data from a server upon the determination that the at least one APN of the one or more available APNs is also indicated in the second APN information, wherein the server is associated with the at least one APN.

9. An apparatus for wireless communications, comprising:

a transceiver for communicating one or more wireless signals via at least a receiver and one or more antennas;

a memory configured to store instructions; and one or more processors communicatively coupled with the transceiver and the memory, wherein the one or more processors are configured to:

obtain, by an internet of things (IoT) device, first access point name (APN) information corresponding to a network entity, the first APN information indicating one or more available APNs;

receive, as part of a personalization procedure for a subscriber identity module (SIM) associated with the IoT device, an indication to verify APNs based on second APN information of authorized APNs stored in the IoT device;

determine, based on receiving the indication, whether at least one APN of the one or more available APNs indicated in the first APN information is also indicated in the second APN information stored in the IoT device; and prohibit communications for the IoT device that correspond to the at least one APN based at least in part on the determination that the at least one APN is not indicated in the second APN information.

10. The apparatus of claim 9, wherein the one or more processors are configured to obtain the first APN information stored on the SIM.

11. The apparatus of claim 10, wherein the first APN information is stored as an APN control list (ACL) on the SIM.

12. The apparatus of claim 9, wherein the one or more processors are configured to obtain the first APN information from the network entity in a network discovery procedure.

13. The apparatus of claim 9, wherein the one or more processors are further configured to determine the second APN information based on a packet data protocol (PDP) profile associated with the IoT device.

14. The apparatus of claim 9, wherein the second APN information corresponds to a service provided by the IoT device.

15. The apparatus of claim 9, further comprising:

providing IoT service data to a server based on the determination that the at least one APN of the one or more available APNs is also indicated in the second APN information, wherein the server is associated with the at least one APN.

16. The apparatus of claim 9, further comprising:

receiving, by the IoT device, service data from a server based on the determination that the at least one APN of the one or more available APNs is also indicated in the second APN information, wherein the server is associated with the at least one APN.

17. An apparatus for wireless communications by an internet of things (IoT) device, comprising:

means for obtaining, by the IoT device, first access point name (APN) information corresponding to a network entity, the first APN information indicating one or more available APNs;

means for receiving, as part of a personalization procedure for a subscriber identity module (SIM) associated with the IoT device, an indication to verify APNs based on second APN information of authorized APNs stored in the IoT device;

means for determining, based on receiving the indication, whether at least one APN of the one or more available APNs indicated in the first APN information is also indicated in the second APN information stored in the IoT device; and means for prohibiting communications for the IoT device that correspond to the at least one APN based at least in part on the determination that the at least one APN is not indicated in the second APN information.

18. The apparatus of claim 17, wherein the means for obtaining obtains the first APN information stored on the SIM.

19. The apparatus of claim 17, wherein the means for obtaining obtains the first APN information from the network entity in a network discovery procedure.

20. The apparatus of claim 17, further comprising means for determining the second APN information based on a packet data protocol (PDP) profile associated with the IoT device.

21. The apparatus of claim 17, wherein the second APN information corresponds to a service provided by the IoT device.

22. A non-transitory computer-readable medium, comprising code executable by one or more processors for wireless communications, the code comprising:

code for obtaining, by an internet of things (IoT) device, first access point name (APN) information corresponding to a network entity, the first APN information indicating one or more available APNs;

code for receiving, as part of a personalization procedure for a subscriber identity module (SIM) associated with the IoT device, an indication to verify APNs based on second APN information of authorized APNs stored in the IoT device;

code for determining, based on receiving the indication, whether at least one APN of the one or more available APNs indicated in the first APN information is also included in the second APN information stored in the IoT device; and code for prohibiting communications for the IoT device that correspond to the at least one APN based at least in part on the determination that the at least one APN is not indicated in the second APN information.

23. The non-transitory computer-readable medium of claim 22, wherein the code for obtaining obtains the first APN information stored on the SIM.

24. The non-transitory computer-readable medium of claim 22, wherein the code for obtaining obtains the first APN information from the network entity in a network discovery procedure.

25. The non-transitory computer-readable medium of claim 22, further comprising code for determining the second APN information based on a packet data protocol (PDP) profile associated with the IoT device.

26. The non-transitory computer-readable medium of claim 22, wherein the second APN information corresponds to a service provided by the IoT device.

* * * * *